United States Patent [19]
Seino et al.
[11] Patent Number: 4,919,471
[45] Date of Patent: Apr. 24, 1990

[54] WEATHERSTRIP FOR SASHLESS DOOR IN AUTOMOTIVE VEHICLES

[75] Inventors: Hitoshi Seino; Kensuke Kondo; Takeomi Takamiya, all of Chiba, Japan

[73] Assignee: Kinugawa Rubber Industrial Co., Ltd., Chiba, Japan

[21] Appl. No.: 324,216

[22] Filed: Mar. 15, 1989

[30] Foreign Application Priority Data

Mar. 16, 1988 [JP] Japan .................................. 63-62506
Dec. 28, 1988 [JP] Japan ................................ 63-332504
Feb. 28, 1989 [JP] Japan .................................. 64-48802

[51] Int. Cl.[5] ............................ B60J 9/00; E06B 7/16
[52] U.S. Cl. .................................... 296/154; 296/201; 49/476; 49/488; 49/498
[58] Field of Search ........................ 296/201, 146, 154; 49/476, 488, 498

[56] References Cited

U.S. PATENT DOCUMENTS 4,355,843 10/1982 Murakami ............................ 296/201
4,709,957 12/1987 Ohya .................................... 296/146
4,807,923 2/1989 Nakamura ............................ 296/146
4,827,670 5/1989 Kosigo et al. ........................ 296/154

*Primary Examiner*—Robert R. Song
*Attorney, Agent, or Firm*—Bachman & LaPointe

[57] ABSTRACT

A weather strip for a sashless door for automotive vehicles comprises an extrusiion molded member retained by a roof rail and pillars of the vehicular body, having a pair of seal lip portions, the first lip thereof including a sub-concavity on its inner surface to maximize sealing performance, through which the extrusion molded member mates with the edge and the inner perimeter surface of the window in a water tight fashion, and end members provided on the outer side panel of the vehicular body at the lower ends of the extrusion molded member. An opening is provided on the end member for allowing water between the extrusion molded member and the door glass to flow along the extrusion molded member toward the end member, and into a fluid passage connected to the opening for exhausting the water outside of the vehicular cabin.

Thus, the water between the extrusion molded member and the door glass is smoothly drained through the fluid passage outside of the vehicular cabin, thereby preventing water from dripping into the vehicular cabin.

A cut-out is further provided in the second of the seal lips at the point where the extrusion molded member abuts another member allows for placement of a die molded insert to increase the rigidity of the extrusion molded member at the point of contact.

12 Claims, 4 Drawing Sheets

WEATHERSTRIP FOR SASHLESS DOOR IN AUTOMOTIVE VEHICLES

BACKGROUND OF THE INVENTION

1. Field of the Invention

The present invention relates to a weatherstrip for a sashless door in automotive vehicles, particularly to a weatherstrip which is capable of allowing water to drain from the space between the edge of the sashless door and the seal lip portion of the weatherstrip, and which also has high durability and maximal sealing characteristics between the window and the weatherstrip.

2. Description of the Prior Disclosure

Recently, there have been proposed and developed various weatherstrips which are applicable in sashless door type automotive vehicles which are capable of sealing the space between the window and the side panel of the vehicular body.

One such weatherstrip is illustrated in FIGS. 1 and 2. This conventional weatherstrip 4 is retained by an outer side roof rail and the roof support pillars of a sashless door type automotive vehicle 1 and is arranged in such a manner that the seal lip portion of the weatherstrip mates with upper and side edge portions of the inner window surface of the window 5 of a rear sashless door 2 and the inner window surface of the window 6 of a front sashless door 3. This prevents water trapped between the weatherstrip and the window from entering into the vehicular cabin. The weatherstrip 4 is secured on the outer roof rail and to the roof pillars through a retainer 10 and also is provided with a hollow seal portion 7 which mates with the upper and side edge portions of the windows 5 and 6. Further, the weatherstrip 4 is integrally formed with an extrusion molded portion 8 extending along the pillars and upper rail, and two die molded end portions 9 where the weatherstrip terminates at the front and rear door waist. This conventional weatherstrip has been disclosed in the Japanese Patent First Publication (Tokkai Showa) 60-219146. As set forth above, such weatherstrips are provided so as to prevent the entry of water, for example rainwater, water under pressure such as during car washing, or the like, into the vehicular cabin. However, some water tends to become trapped between the window edge 5*a*, the inner perimeter of the window surface 5*b*, and the hollow seal portion 7 during car washing or heavy rain.

The water that is trapped between the end portions of the window and the hollow seal lip portion drips into the vehicular cabin, when the door is opened in a condition where the corresponding window is fully closed.

In FIG. 3, another type of weatherstrip 20 which has a main seal lip portion 21*a* and a sub seal lip portion 21*b* formed on the hollow seal portion 21, is shown. Between the main seal lip portion 21*a* and the sub lip seal portion 21*b*, a groove 22 is defined. The groove 22 functions to forcibly capture rainwater or water during car washing, thereby preventing the water from entering between the mating portions with slightly inferior sealing properties between the weatherstrip and the window. This double lip seal type weatherstrip 20 is provided a retainer 10 which is secured by a fastening means, such as tapping screws on the outer roof rail and the pillars of the vehicular body in such a manner that the main seal lip portion 21*a* mates with the inner perimeter of the window surface 5*b* to a depth of substantially 20 mm, and the sub seal lip portion 21*b* mates with the edge portion 5*a* of the windows 5 and 6. Normally, suitable sealing material is inserted between the retainer 10 and the outer side roof rail 23 of the automotive vehicle 1. However, as shown in FIG. 3, however, in such double lip seal type weatherstrips, water tends to stay in the aperture between the inner perimeter of the window 5 surface 5*b* and the water capturing groove 22 defined by the pair of lips 21*a* and 21*b*. The structure of the double lip seal type weatherstrip is similar to that of the weatherstrip shown in FIG. 2. except for the groove 22. Although it is not shown in the drawings, the groove 22 extends along the edge portion of the door window under the condition of the window being closed, however the groove is so formed as to end at the die molded end portions 9 of the weatherstrip 20. As a result, the water is not drained outside of the vehicle, but remains trapped in the above mentioned aperture. Therefore, the trapped water can enter into the vehicular cabin, when the sashless door 5 is opened. In double lip seal type weatherstrips for the sashless door type automotive vehicles, an inner lip portion 25 extends inside of the vehicle. In order to gain greater sealing, the inner lip portion 25 mates with an outer periphery of a U-shaped garnish 26 which is made of synthetic resin and which engages with a flange portion connecting an outer side roof rail 23 and an inner side roof rail 24. Such a double lip seal type weatherstrip has been disclosed in the Japanese Utility Model First Publication (Jikkai Showa) 61-67258.

FIG. 4 shows the conventional connecting method suitable for sealing the space between the front window 6 and the rear window 5 in sashless door type automotive vehicles without center pillars. A center seal rubber 27 adheres to the forward facing edge portion of the rear window glass 5. In vehicles with center seal rubbers, a slight breach tends to be formed in the vicinity of the center rubbers 27 mating with the weatherstrip shown in FIGS. 2 and 3. This deteriorates the sealing performance of the weatherstrip at the point where the rear edge of the front window glass 6 opposes the front edge of the rear window glass 5. Specifically, in the dual lip seal type weatherstrips as shown in FIG. 3, the sealing performance of the weatherstrip is lowered due to the water capturing groove, and the breach of seal occurring where the center rubber meets the weatherstrip.

SUMMARY OF THE INVENTION

It is, therefore in view of the above disadvantages, an object of the present invention to provide a weatherstrip for sashless door automotive vehicles, which is capable of allowing water trapped between the edge portion of the door glass and the seal lip portion of the weatherstrip to drain outside of the automotive vehicle.

It is another object of the invention to provide a weatherstrip of sashless door automotive vehicles, which has high durability and provides maximum sealing performance.

In order to accomplish the aforementioned and other objects, a weatherstrip for sashless door automotive vehicles, comprises an extrusion molded member retained by a roof rail and the roof support pillars of the vehicular body, having a pair of seal lip portions through which the extrusion molded member mates with the edge and the inner perimeter of the window surface, the pair of seal lip portions define a groove between the top ends thereof. An end member is provided on the outer surface of the side panel of the vehicular body, the end member being matched with the lower end of the extrusion molded member. An opening is provided on the end member, the opening being aligned with the groove exposed at the lower end of the extrusion molded member for permitting captured water within the groove to drain therefrom, and a fluid passage connected to the opening for exhausting the water outside of the vehicular cabin. The end member is integral with said extrusion molded member. The fluid passage is defined by the outer surface of the side panel of the vehicular body and the concavity formed on the installation surface of the end member relative to the outer surface of the side panel. Preferably, the fluid passage is flexibly connected from the opening to an exhaust port thereof, the exhaust port being arranged in a lower position than the opening, thereby preventing the reverse flow of the water in the fluid passage. For the purpose of higher sealing performance, the extrusion molded member comprises an arc-shaped guide wall, from which protrude the pair of seal lip portions, the guide wall extending in a direction substantially parallel to the the top edge of the window. A sub-concavity is provided within the hollow portion of the first lip causing the wall of said lip to be thinner, and thus more flexible, at a point just below where the lip encounters the window glass. When the window is fully raised the first lip bends to mate with the inner perimeter of the window surface under increased pressure to insure maximum sealing performance.

Moreover, a second seal lip, mainly mating with the window edge is preferably provided with a cut-out for the insertion of a spacer at the point where the extrusion molded member abuts the center seal rubber between front and rear windows or at any point where the extrusion molded member mates with other members. The spacer has a cross-sectional area such that the contiguous surface defined by the cut-out of the second seal lip and the top surface of the first seal lip is substantially parallel to the arc-shaped guide wall from which both lips protrude. The cut-out is easily formed with a longitudinal cut formed along the root portion of the second seal lip and a pair of lateral cuts which extend perpendicularly from the both ends of the longitudinal cut.

According to the present invention, the remaining water between the weatherstrip and the door glass is smoothly exhausted from the opening through a fluid passage outside of the vehicular cabin, thereby preventing the remaining water from dripping into the vehicular cabin, when the sashless door is open.

Furthermore, the improved weatherstrip according to the invention has high durability and high watertightness.

DESCRIPTION OF THE PREFERRED EMBODIMENTS

Figure 1:
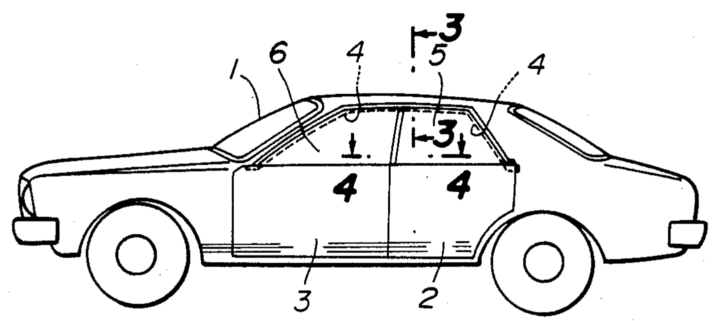
FIG. 1 is a side view of a sashless door type automotive vehicle.
Figure 2:
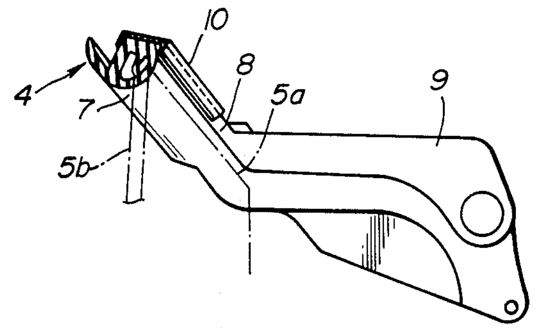
FIG. 2 is a partially cutaway perspective view illustrating an end portion of a conventional weatherstrip which is used for the sashless door type automotive vehicle and which is positioned adjacent the lower portion of the rear pillar of the vehicle.
Figure 3:
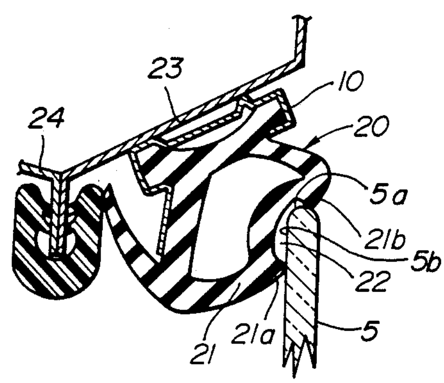
FIG. 3 is an enlarged sectional view taken along line 3—3 of FIG. 1 and illustrating another type of prior weatherstrip having a pair of seal lip portions.
Figure 5:
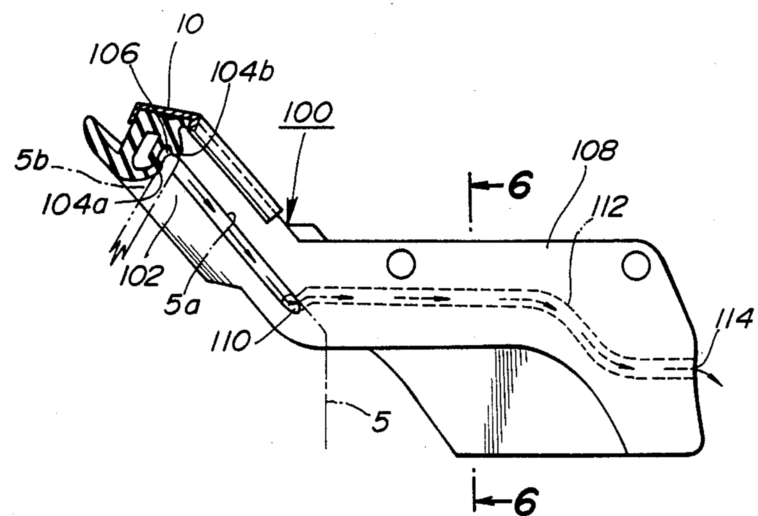
FIG. 5 is a perspective view illustrating the essential parts of the preferred embodiment of the weatherstrip according to the invention.
Figure 6:
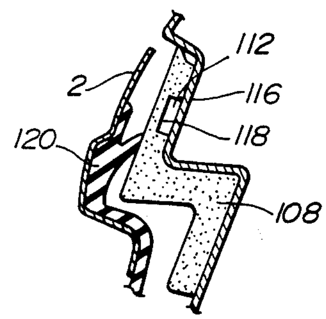
FIG. 6 is a sectional view taken along line 6—6 of FIG. 5.

Referring now to FIGS. 5 and 6, the preferred embodiment of a weatherstrip 100 has a hollow seal portion 102 which is formed with a pair of seal lip portions 104*a* and 104*b* mating with an edge portion 5*a* and an inner perimeter surface 5*b* of a window 5. In other words, the edge portion 5*a* and the inner face 5*b* is hermetically covered by an aperture defined by the groove 106 of the pair of seal lip portions 104*a* and 104*b* and the outer perimeter of the window 5. Furthermore, the weatherstrip 100 includes die molded end sections 108 firmly adhering to the outer surface of a side panel 116 of the vehicular body at each end of the weatherstrip 100, and at the level of the door waist. The above mentioned construction of the weatherstrip 100 is similar to the conventional double seal lip type weatherstrip as shown in FIG. 3.

The weatherstrip 100 of the invention has an opening or an intake port 110 in the position, at which the above mentioned groove 106 ends. The intake port 110 may be integrally formed with the die molded end portion 108.

On the other hand, the end portion 108 includes a concavity 112 which is formed on the installation surface facing the outer surface of the side panel 116, to which it is mounted and as a result an exhaust passage 112 is defined by the outer surface of the side panel 116 and the concavity 112. The intake port 110 is connected to the exhaust passage 112 through which the intake port 110 is communicated with an exhaust port 114. In this construction, water can flow from the groove 106 through the exhaust passage 112 to the exhaust port 114 so as to drain outside of the sashless door type automotive vehicle.

As clearly seen in FIG. 5, since the exhaust passage 112 is flexibly connected from the intake port 110, which is positioned at a relatively high level, to the exhaust port 114, which is positioned at a relatively low level, this passage arrangement prevents water in the passage from flowing backward.

As shown in FIG. 6, the other surface of the end portion 108 further mates with a door weatherstrip 120 provided on the inside door panel of the sashless door 2 in order to prevent water from entering, through the space between the other periphery of the side panel 116 and the inside door panel, into the vehicular cabin.

Although it is not shown in the drawings, the intake portion 110 is not only provided at the lower end of the extrusion molded portion of the weatherstrip 100, but also may be provided at the end portion of the retainer 10 such that the intake port takes in water flowing downwardly along the retailer, thereby allowing the water between the retainer and the weatherstrip to be drained.

Although the construction of the end portion of the weatherstrip according to the invention at the rear pillar of the automotive vehicle is shown in FIG. 5, the construction may be applied for the end portion of the weatherstrip at the front pillar or at the center pillar.

Figure 7:
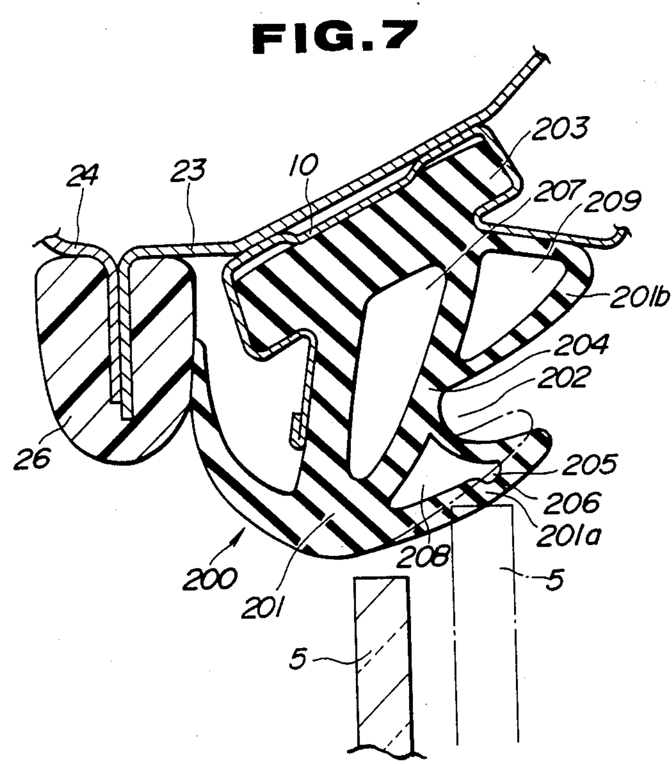
FIG. 7 is a sectional view illustrating another preferred embodiment according to the invention.
Figure 8:
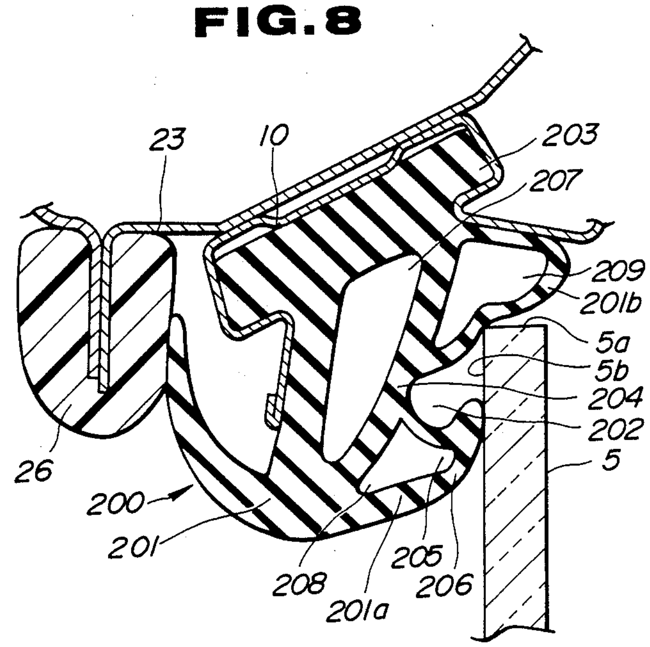
FIG. 8 is a sectional view representing the mating condition between the pair of seal lip portions and the edge portion and the inner perimeter of the window surface.
Figure 9:
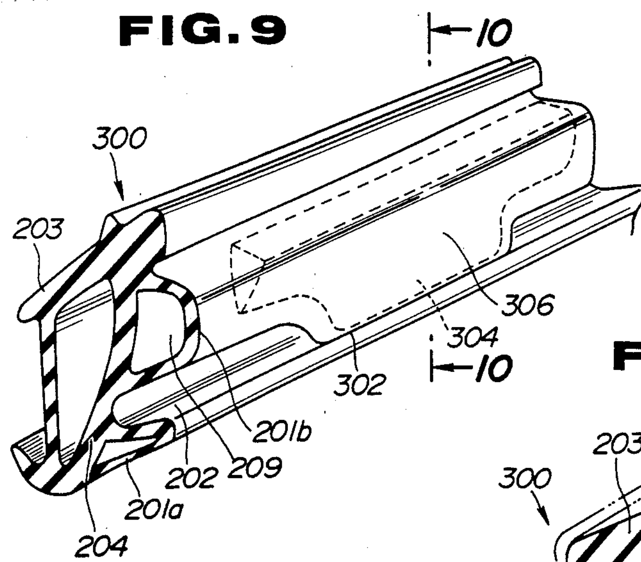
FIG. 9 is a pertially cutaway perspective view illustrating an extrusion molded portion of still another preferred embodiment having a substantially T-shaped spacer inserted in the hollow of the sub seal(second) lip portion according to the invention.

In FIGS. 7 and 8, shown is another preferred embodiment of a double seal lip type weatherstrip having an improved extrusion molded portion. Basically, the construction of the improved weatherstrip 200 is similar to that of the conventional weatherstrip 20 as shown in FIG. 3. For the purpose of simplication of description, the same reference numerals used in the prior art weatherstrip of FIG. 3 will be applied to the corresponding elements used in the embodiment of FIGS. 7 and 8. The embodiment as shown in FIGS. 7 and 8 is different from the prior art weatherstrip 20 as shown in FIG. 3 in that the weatherstrip 200 has a partition wall 204 which separates a hollow within a hollow seal portion 201 into three hollow portions 207, 208, and 209. The hollow seal portion 201 expands from a base portion 203, which is firmly fixed by the retainer 10, to the outside of the vehicle. The first hollow portion 207 is formed directly below to the base portion 203. The second hollow portion 208 is defined by the partition wall 204 and the inner wall of a main seal lip portion 201*a*. On the other hand, the third hollow portion 209 is defined by the partition wall 204 and the inner wall of a sub seal lip portion 201*b*. A water capturing groove 202 is formed between the main seal lip portion 201*a* and a sub seal lip portion 201*b*. Moreover, the improved weatherstrip 200 includes a sub concavity 205 within the second hollow portion 208 near the top end of the main seal lip portion 201*a*, thereby causing a relatively thin wall portion 206 in the vicinity of the top end of the main seal lip portion 201*a*. This facilitates the bend of the top end of the main seal lip portion 201*a* towards the base portion 203. Furthermore, the arc-shaped partition wall 204 extends in the direction of the movement of the door edge during the opening and closing movement of the door. That is to say, the partition wall 204 serves to guide the movement of the top end of the door window. Therefore, the above mentioned water capturing groove 202 is reliably maintained when the door window moves to the maximum upper position and the top end of the main seal lip portion 201*a* is pushed upward when the door is closed under a fully closed condition of the door window. As clearly shown in FIG. 8, the top end of the main seal lip portion 201*a* is easily deformed due to the thin wall portion 206 by a small pressure, thereby allowing the main seal lip portion 201*a* to mate with the inner perimeter window surface 5*b* optimally. As set forth above, the weatherstrip 200 of the invention including the partition wall 204 and the sub concavity 205, is capable of maintaining the water capturing groove 202 and provides high sealing performance. In a weatherstrip combining the constructions shown in FIGS. 5 and 7, the captured water within the groove 202 is smoothly exhausted along the aperture defined by the groove and the inner peripheral window surface via the opening formed at the lower position of the extrusion molded portion through the exhaust passage to the exhaust port.

Figure 4:
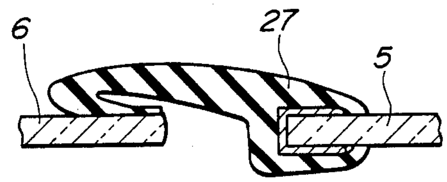
FIG. 4 is a sectional view illustrating an opposing portion between the respective edges of the front and rear window glasses and taken along line 4—4 of FIG. 1.
Figure 11:
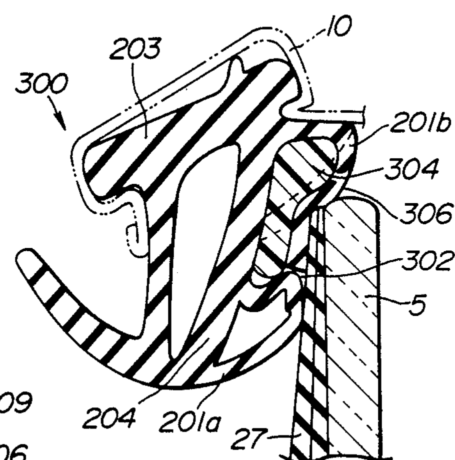
FIG. 11 is a partially perspective view illustrating a cut-out through which the spacer as shown in FIG. 9 is inserted into the hollow of the sub seal lip portion.
Figure 10:
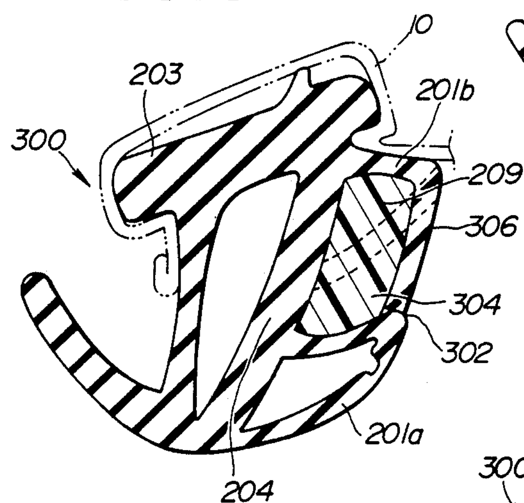
FIG. 10 is a sectional view taken along line 10—10 in FIG. 9.
Figure 12:
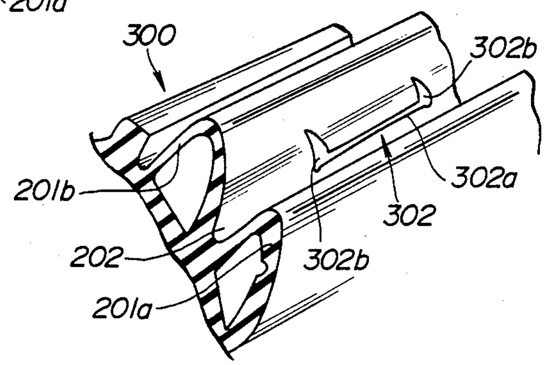
FIG. 12 is a sectional view illustrating a mating condition between the extension molded portion having the spacer as shown in FIG. 9 and the window edge, inner perimeter window surface, and center seal rubber.

In FIGS. 9, 10, 11, and 12, shown is still another preferred embodiment of a double seal lip type weatherstrip having a further improved extrusion molded portion, which includes a spacer in the hollow of a sub seal lip portion and which is used for automotive vehicles with a center seal rubber as shown in FIG. 4 instead of a center pillar. The basic construction of the weatherstrip 300 as shown in FIGS. 9 to 12 is similar to that of the double seal lip type weatherstrip as shown in FIGS. 7 and 8. Therefore, the same reference numerals used in the embodiment of FIGS. 7 and 8 will be applied to the corresponding elements used in the embodiment of FIGS. 9 to 12. The embodiment as shown in FIGS. 9 to 12 is different from the embodiment as shown in FIGS. 7 and 8 in that the extrusion molded portion allows for insertion of a spacer 304 which is arranged in the hollow of the sub seal lip portion 201*b* and at the mating portion between the extrusion molded portion and the center seal rubber and which is made of sponge rubber materials. The length of the spacer 304 is larger than the width of the center seal rubber 27 as shown in FIG. 4 for increasing the rigidity other weatherstrip. As a result, the portion of the extrusion molded portion having the spacer mates with the center seal rubber 27 under pressure. Particulary, when, as shown in FIG. 10, the spacer has a cross-sectional area such that the contiguous surface defined by the outer surfaces of the cut-out portion of the sub seal lip portion 201*b* and the main seal lip portion 201*a* is substantially parallel to the arc shaped partition wall 204, the contiguous surface mates with the edge and the inner perimeter window surface of the door window with a relatively high pressure as shown in FIG. 11. This ameliorates the performance of sealing within the particular range in which the center seal rubber abuts the extrusion molded portion with the spacer. As shown in FIG. 12, the spacer 304 is inserted through a cut-out 302, which is comprised of a longitudinal cut 302*a* and a pair of lateral cuts 302*b* and which is done in a predetermined position to define the above mentioned contiguous surface, into the hollow of the sub seal lip portion 201*b*.

As will be appreciated from the above, since the weatherstrip 300 as shown in FIGS. 9 to 12 is comprised of a continuous extrusion molded member in the mating position, in which the center seal rubber mates therewith under the fully closed condition of the door, the weatherstrip 300 has high durability and high sealing performance in the position mating the center seal rubber in comparison with the prior art weatherstrip which included a die molded portion being integrally formed and placed between both ends of a pair of extrusion molded members for the purpose of high sealing performance or water-tightness at the mating position of the center seal rubber and the weatherstrip. In the prior art, the seams between the die molded portion and the pair of extrusion molded portions has lower durability than a continuous seamless extrusion molded member plus insert. In other words, the age deterioration of the prior art seam portion is marked.

As set forth above, the weatherstrip 300 of the invention including the spacer 304, provides high durability and high performance of sealing at the particular region in which the center seal rubber 27 mates with the extrusion molded member. In the weatherstrip combined by the constructions shown in FIGS. 5 and 9, the captured water within the groove 202 is smoothly exhausted along the aperture defined by the groove and the inner peripheral window surface via the opening formed at the lower position of the extrusion molded portion through the exhaust passage to the exhaust port and further the weatherstrip has high durability at this particular mating region in spite of frequent opening and closing of doors.

Although, in the embodiment, the spacer is inserted into the hollow of the sub seal lip portion of a double seal lip type weatherstrip at the mating position of the center seal rubber and the extrusion molded member, the spacer may be inserted into the hollow of the seal lip portion at any other position in which the extrusion molded member mates with another member, such as a corner piece, so as to ameliorate performance of sealing of the weatherstrip.

While the foregoing is a description of the best mode for carrying out the invention, it will be understood that the invention is not limited to the particular embodiments shown and described herein, but that various changes and modifications may be made without departing from the the scope or spirit of this invention as defined by the following claims.

What is claimed is:

1. A weatherstrip for a sashless door for automotive vehicles, comprising:

an extrusion molded member provided on a roof rail and pillars of a vehicular body, having a pair of seal lip portions through which said extrusion molded member mates with the end and the inner perimeter surface of the window of said sashless door in a water tight fashion, said pair of seal lip portions define a groove between the both top ends thereof;

an end member provided on the outer surface of the side panel of said vehicular body, said end member connected to the lower end of said extrusion molded member;

an opening provided on said end member in the vicinity of the connecting portion between said extrusion molded member and said end member, said opening being associated with said groove lying at the lower end of said extrusion molded member for permitting captured water within said groove to drain therefrom; and a fluid passage connected to said opening for exhausting said water outside of the vehicular cabin.

2. A weatherstrip for a sashless door for automotive vehicles as set forth in claim 1, wherein said end member is integrally formed with said extrusion molded member.

3. A weatherstrip for a sashless door for automotive vehicles as set forth in claim 1, wherein said fluid passage is defined by the outer surface of the side panel of said vehicular body and the concavity formed on the installation surface of said end member relative to said outer surface of said side panel.

4. A weatherstrip for a sashless door for automotive vehicles as set forth in claim 3, wherein said fluid passage is flexibly connected from said opening to an exhaust port thereof, said exhaust port being arranged in a lower position than said opening, thereby preventing the reverse flow of said water in said fluid passage.

5. A weatherstrip for a sashless door for automotive vehicles as set forth in claim 1, wherein said extrusion molded member comprises an arc-shaped guide wall, from which protrude said pair of seal lip portions, said guide wall extending in a direction substantially parallel to the top edge of said window, and a thin wall portion in the vicinity of the top end of a first seal lip of said pair of seal lip portions mainly mating with the inner perimeter surface of said door glass.

6. A weatherstrip for a sashless door for automotive vehicles as set forth in claim 5, wherein said thin wall portion is defined by a sub concavity which is formed on the inner wall of said first seal lip and which is arranged beneath the top end of said first seal lip.

7. A weatherstrip for a sashless door for automotive vehicles as set forth in claim 1, wherein said extrusion molded member has a spacer, being inserted through a cut-out which is formed on the groove side wall of a second seal lip of said pair of seal lip portions, said second lip mainly mating with the end of said window, said spacer being arranged in the mating position where said extrusion molded member abuts with another member.

8. A weatherstrip for a sashless door for automotile vehicles as set forth in claim 7, wherein said spacer has a cross-sectional area such that the contiguous surface defined by said cut-out of said second seal lip and the top surface of said first seal lip is substantially parallel to the arc-shaped guide wall.

9. A weatherstrip for a sashless door for automotive vehicles as set forth in claim 8, wherein said cut-out is comprised of a longitudinal cut formed along the root portion of said second seal lip and a pair of lateral cuts which extend perpendicularly from the both ends of said longitudinal cut.

10. A weatherstrip for a sashless door for automotive vehicles as set forth in claim 5, wherein said extrusion molded member has a spacer, being inserted through a cut-out which is formed on the groove side wall of a second seal lip of said pair of seal lip portions, said second lip mainly mating with the end of said window, said spacer being arranged in the mating position where said extrusion molded member abuts with another member.

11. A weatherstrip for a sashless door for automotive vehicles as set forth in claim 10, wherein said spacer has a cross-sectional area such that the contiguous surface defined by said cut-out of said second seal lip and the top surface of said first seal lip is substantially parallel to the arc-shaped guide wall.

12. A weatherstrip for a sashless door for automotive vehicles as set forth in claim 11, wherein said cut-out is comprised of a longitudinal cut formed along the root portion of said second seal lip and a pair of lateral cuts which extend perpendicularly from the both ends of said longitudinal cut.

* * * * *